June 26, 1956  L. W. MINNIS  2,752,116
CAMERA SUPPORTING HEADS FOR TRIPODS OR THE LIKE
Filed Feb. 15, 1955
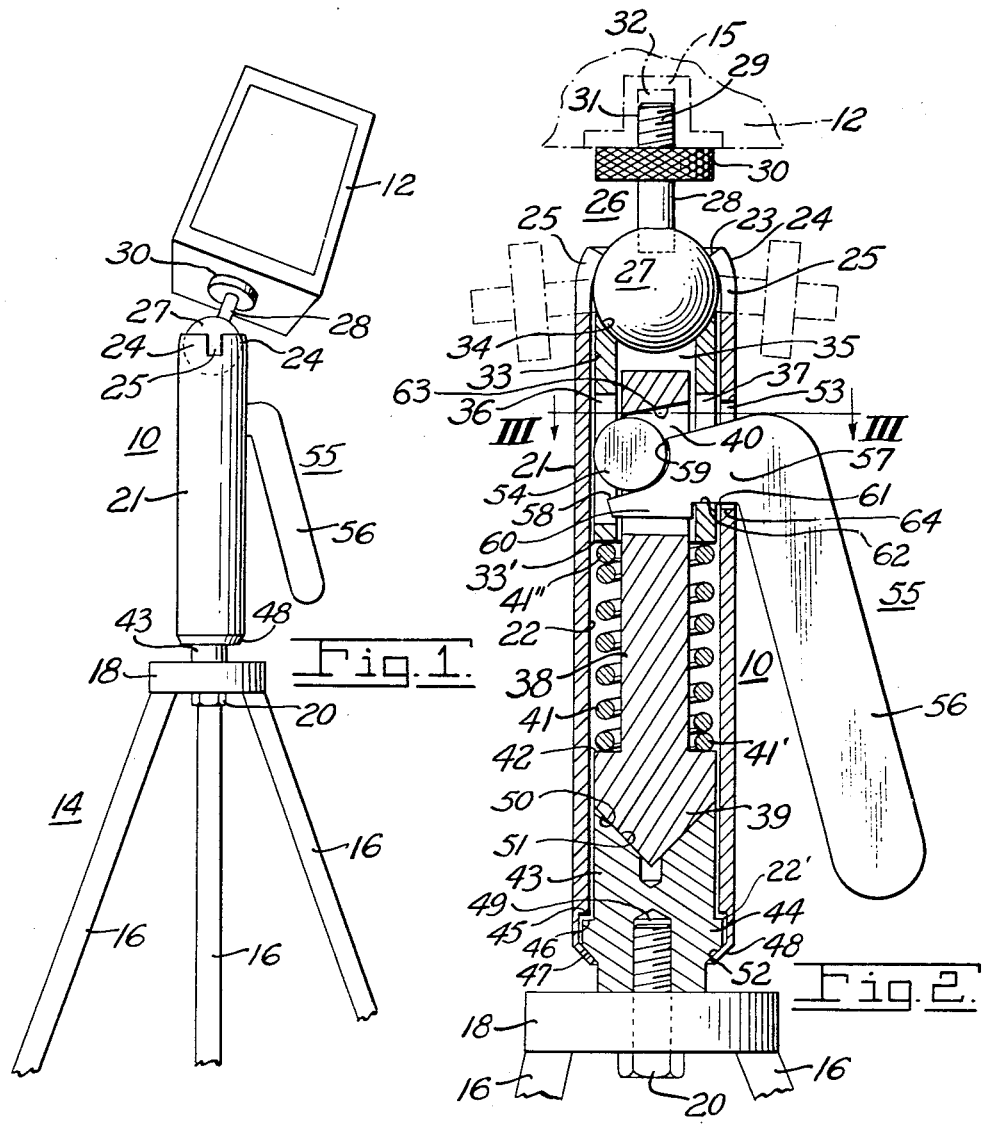
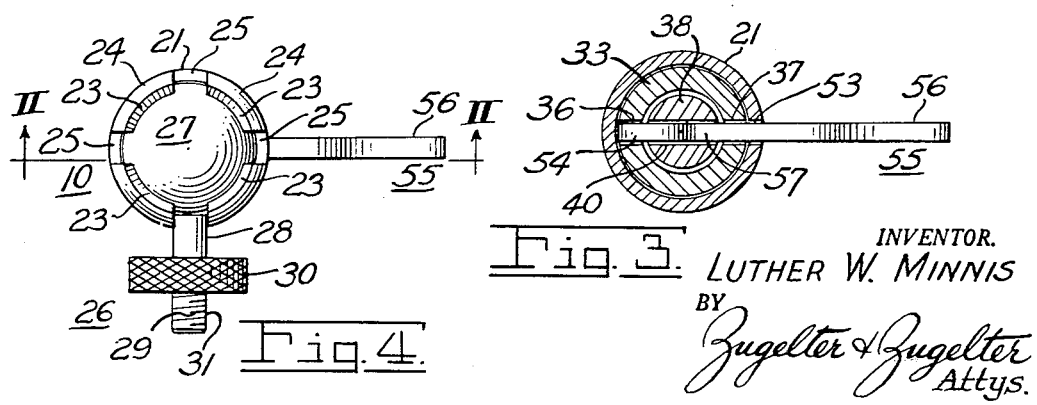
INVENTOR.
LUTHER W. MINNIS
BY
Zugelter & Zugelter
Attys.

United States Patent Office

2,752,116
Patented June 26, 1956

2,752,116

CAMERA SUPPORTING HEADS FOR TRIPODS OR THE LIKE

Luther W. Minnis, San Bernardino, Calif.

Application February 15, 1955, Serial No. 488,311

1 Claim. (Cl. 248—181)

This invention relates to camera supports, and more particularly to camera supporting heads for tripods or the like.

An object of this invention is to provide a compact camera support which may easily and quickly be attached to a tripod or the like.

A further object of this invention is to provide a camera supporting head of the above character which is sturdily constructed for co-operative attachment to a tripod or the like to provide firm, steady support for a camera.

A further object of this invention is to provide a camera supporting head having means for pivotally securing a camera adjacent one end thereof and adjacent the other end thereof being adapted for engaging means firmly securing same to a tripod or other support for azimuth rotation, and means for locking the camera in selected positions.

A further object of this invention is to provide a camera supporting head of the above character having several lock means releasable by a single actuating control means whereby said locking means may be simultaneously released to permit repositioning of the supported camera.

A further object of this invention is to provide a camera supporting head for supporting a camera upon a camera post swingable through a wide arc, preferably in excess of 180° in at least one plane, and the camera head structure except for the stub part or base portion thereof, being axially rotatable about an axis perpendicular to the axis of rotation of the first mentioned means pivotally securing the camera to said head.

This is a continuation-in-part of my co-pending application serial number 436,829, June 15, 1954, which matured as Letter Patent No. 2,703,691 on March 8, 1955.

The above and other objects of this invention will be apparent to those having ordinary skill in this art, from the following description taken in conjunction with the accompanying drawing in which:

Fig. 1 is a view in perspective of a camera supporting head embodying this invention, secured in cooperative relation to a tripod and a camera;

Fig. 2 is a view in longitudinal cross-section of the device illustrated in Fig. 1, and taken along the plane indicated by the line II—II in Fig. 4;

Fig. 3 is a view in transverse cross-section of the device illustrated in Fig. 1 and taken along the line III—III in Fig. 2; and Fig. 4 is a top plan view of the device illustrated in Fig. 2 with the camera post swung into one of the positions shown in dot-dash lines in Fig. 2.

In Fig. 1 a device 10 embodying the present invention is illustrated in co-operation with a camera 12 and a tripod 14. The tripod 14 may be of the conventional type having three legs 16 joined to a table 18 having a central aperture through which a mounting screw 20 extends. The mounting screw 20 may be used to mount a camera directly upon table 18 by engagement of screw 20 with a threaded tripod socket usually provided in a camera body. Such mounting of a camera upon tripod 14 renders repositioning of the camera difficult and to provide support means which will support a camera 12 in a wide variety of positions as desired and facilitate repositioning of same without movement of the tripod, I provide the camera support device 10.

As shown most clearly in Fig. 2, the camera support 10 comprises an elongate tubular body or frame 21 having a longitudinal bore or internal cavity 22. The upper end of camera support frame 21 (as shown in Fig. 2) is provided with an inwardly projecting lip 23 comprising the free end portions of a plurality of fingers 24 which are integral portions of frame 21. Fingers 24 are spaced from each other by slots 25 of substantially equal and constant width which extend radially outwardly from lip 23, as shown in Fig. 4. In the drawing, the slots 25 are four in number, spaced at 90° and adapted to receive a portion of post 28 as illustrated in Fig. 4. A camera post assembly 26 comprises a spherical or ball-shaped portion 27 and a post 28 extending radially therefrom in fixed relation thereto and having the portion adjacent the free end thereof provided with threads 29 which are adapted for co-operative engagement with nut 30. Post 28 and ball 27 may be assembled in unitary relation and with the threaded end of the post leading, the assembly may be inserted into and slid through bore 22 of frame 21 until post 28 projects beyond lip 23 with ball 27 retained in bore 22 by fingers 24. The projecting portion of post 28 may be held against rotation while nut 30 is placed in engagement with threads 29 and rotated to advance same towards ball 27 until nut 30 jambs in fixed relation to post 28. As illustrated in Fig. 2, when nut 30 has been so assembled upon post 28 a short threaded stud portion 31 of post 28 projects from nut 30 remote from ball 27. Stud portion 31 is adapted for threaded co-operation with the camera striped socket 32.

To retain ball 27 in position adjacent fingers 24, I provide a ball-clamping member 33 of elongate, tubular form, received in bore 22 for reciprocation therein. As illustrated most clearly in Fig. 2, ball-clamping member 33 has a seat-like end face 34 shaped to substantially conform to the surface of ball 27. An axial bore 35 extends through clamping member 33, and a pair of diametrically opposed apertures 36 and 37 are provided in the walls of tubular member 33 in communication with bore 35. A second clamping member 38—39, comprises an elongate tongue portion 38 and an integral shoulder or root portion 39. Tongue portion 38 has an elongate aperture 40 adjacent its end remote from root portion 39 and is adapted to be received in bore 35 for reciprocation therein relative to member 33. Prior to insertion of the clamping member 38—39 into the bore 22 of body 21, an helical coil spring 41 is placed in encircling relation to tongue 38 with its end 41' in abutment with face 42 of root portion 39. Member 38—39 and spring 41 are inserted into bore 22 so that a portion of tongue 38 extends into axial bore 35 and end 41" of spring 41 abuts end face 33' of ball clamping member 33. Stub leg or post base 43 has a projecting annular shoulder or rib portion 44 spaced intermediate its ends which is received in the enlarged counter-bored portion 22' of bore 22 adjacent the end thereof remote from fingers 24, but is too large to be received in bore 22 of frame 21. As shown in Fig. 2, I prefer that annular co-operating faces 45 and 46 of frame 21 and stub leg rib 44 are planar and adapted to co-operate as non-sticking abutment faces. I prefer that the annular face 47 on rib 44 be conic in form. To retain stub leg 43 against substantial axial reciprocation relative to frame 21, I prefer that the counter-bored portion of frame 21 can be formed to provide an annular retaining lip 48 having a conic face adapted to co-operate with opposed conic face 47 on stub leg shoulder 44. As shown most clearly in Fig. 2, an axial bore 49 may be provided for receiving mounting screw 20 in threaded engagement with stub leg 43 for securing same in fixed relation to co-operating supporting means such as tripod table 18. A substantially conic face 51 is provided on the end of stub leg 43 opposed to and co-operatively engageable with mating conic face 50 on the shoulder or root portion of member 38—39.

As shown in Fig. 2, helical spring 41 is always loaded under compression when device 10 is in assembled relation. Thus, spring 41 urges ball clamping member 33 toward lip 23 to clamp ball 27 between fingers 24 and face 34 while member 38—39 is simultaneously urged away from member 33 toward retaining lip 48 to clamp stub leg faces 47 and 51 in firm, frictional abutting engagement with the opposed faces 52 and 51 of retaining lip 48, and root member 39, respectively.

To move locking members 33 and 38—39 into nonlocking relationship with ball 27 and stub leg 43, I provide a roll 54, a crank lever 55 having arms 56 and 57, and an aperture 53 in frame 21 in registry with registering apertures 37, 40, and 36. Roll 54 and arm 57 may be inserted through aperture 53 to the respective positions illustrated in Fig. 2. As illustrateed in Fig. 2, arm 57 is notched adjacent the free end thereof to co-operate with roll 54. The notch bounding portion of the edge face 58—59 is adapted for co-operative engagement with roll 54. The face portion 58 is adapted for rolling engagement with the periphery of roll 54 while portion 59 serves as a stop abutment limiting advance of roll 54 toward the right as shown in Fig. 2. Arm 57 has a retaining lug projection 60 adapted to preclude unintentional withdrawal of arm 57 from operative engagement with co-operating parts. The edge face portion 61 of arm 57 intermediate projection 60 and arm 56 is adapted to co-operate with a portion of the edge face 62 bounding aperture 37 in member 33. Face portion 62 serves as a fulcrum for arm 57 and co-operates with edge face 61. As arm 56 is swung clockwise (Fig. 2) toward a position of parallelism relative to frame 21, roll 54 is between and co-operates with the opposed arm face 58 and tongue face 63 to effect telescoping of tongue 38 into the bore 35 of member 33, longitudinally compressing spring 41 and moving ball-engaging face 34 and stub leg engaging face 50 toward each other, freeing ball 27 and stub leg 43 for movement. In the event that leg 43 and root member 39 stick together, I provide a second fulcrum 64 adapted to co-operate with edge face 61 of arm 57 to effect positive separation of faces 50 and 51. To effect such separation, swinging of lever 56 toward a position of parallelism with frame 21 moves faces 46 and 45 into abutment, and edge face 61 in co-operative engagement with fulcrum 64. Further movement of arm 56 toward a position of parallelism to frame 21, effects positive mechanical movement of member 38—39 relative to frame 21 and axially away from stub leg 43 held in fixed relation to frame 21 by co-operating abutment faces 45 and 46.

For use, the device 10 may be secured to any suitable support, such as tripod table 18, by means such as screw 20 in threaded engagement with threaded socket 49 to secure stub leg 43 in fixed relation to table 18. Camera 12 may be mounted upon post 28 by placing threaded stud portion 31 in firm engagement with a camera tripod socket 15 which is also in frictional locking abutment with nut 30. A cameraman may grasp the camera with one hand and frame 21 and arm 56 with the other hand. By squeezing arm 56 toward a position of parallelism with frame 21, the stub leg 43 and camera post assembly 26 may be freed for reorientation, relative to frame 21, to place the camera in the position desired. The grip upon post 21 and arm 56 is then relaxed to permit arm 56 to swing away from the position of parallelism with post 21 to release spring 41 for moving clamping member 33 38—39 and member 33 into clamping relation to sphere 27 and stub leg 43, to lock the camera in the position desired. I have also found in addition to serving as means for co-operatively securing a camera to a support such as a tripod, as described above, devices embodying my invention may also be used as a handle for a camera and when so used, the position of the frame 21 may be adjusted to a position relative to the camera for most convenient holding of same in the position desired.

Having described the invention, it will be apparent to those having ordinary skill in this art, that various modifications and changes may be made in the illustrated embodiment thereof without departing from the spirit or the scope of the invention.

Therefore, what I claim as new and desire to secure by Letters Patent is:

For a camera a support comprising an elongated frame having a longitudinal bore extending therethrough, said frame being counter-bored adjacent one end thereof to provide an enlarged portion of said bore, said frame adjacent the other end thereof being provided with a plurality of diametrally disposed slots defining integral finger portions, said finger portions being curved inwardly to provide a bore mouth of reduced diameter, a pivot member disposed in said frame bore for co-operative engagement with said fingers, camera mounting means secured to said pivot member and projecting beyond said frame for engagement with a camera spaced from said frame, an axially rotatable leg member having an annular rib about its mid-section, a portion of said leg being received in the bore of said frame with the rib portion thereof in the enlarged portion of said bore, an inwardly projecting annular lip for engaging said annular rib to retain a portion of said leg within the enlarged portion of said frame bore, a first clamping member reciprocable in said frame bore engageable with said pivot member for urging same into fixed engagement with said fingers, a second clamping member reciprocable in said frame bore engageable with said leg for urging same into fixed engagement with said annular lip, resilient means urging said clamping members toward clamping relation to said pivot member and leg, and means including a crank lever for moving said clamping members away from clamping relation to said pivot member and leg in opposition to said resilient means, whereby said camera mounting means and said leg may be repositioned relative to said frame as desired.

References Cited in the file of this patent

UNITED STATES PATENTS

| 2,444,727 | Bush | July 6, 1948 |
| 2,673,702 | Pasturczak | Mar. 30, 1954 |

FOREIGN PATENTS

| 635,871 | Germany | Feb. 2, 1935 |